United States Patent [19]

Schreyer

[11] 4,009,770
[45] Mar. 1, 1977

[54] HOIST BRAKE CONSTRUCTION FEATURING CAM DEVICES

[75] Inventor: Kenneth D. Schreyer, Clarence, N.Y.

[73] Assignee: Columbus McKinnon Corporation, Tonawanda, N.Y.

[22] Filed: Nov. 10, 1975

[21] Appl. No.: 630,276

[52] U.S. Cl. .......................... 188/82.74; 188/134; 192/8 R

[51] Int. Cl.² .......................... F16D 63/00

[58] Field of Search ............ 188/82.74, 134, 72.7, 188/82.1, 82.3, 82.34, 82.7, 82.9, 82.77; 192/7, 12 B, 41 R, 8 R; 254/167, 168; 74/505, 575

[56] References Cited

UNITED STATES PATENTS

| 2,590,610 | 3/1952 | Grosch | 188/82.9 |
| 2,690,240 | 9/1954 | Schroeder | 188/82.74 |
| 2,894,610 | 7/1959 | Harrington | 188/82.9 X |
| 3,433,332 | 3/1969 | Braun | 188/134 |

Primary Examiner—Trygve M. Blix
Assistant Examiner—Douglas C. Butler
Attorney, Agent, or Firm—Bean & Bean

[57] ABSTRACT

A hoist employs a modified Weston brake characterized as having an axially aligned ratchet pawl or plate and ratchet wheel assembly and a cam device operable to supplement spring force applied to the ratchet assembly for gaining and maintaining a positive engagement of the ratchet assembly during load lowering or holding thereof.

13 Claims, 6 Drawing Figures

HOIST BRAKE CONSTRUCTION FEATURING CAM DEVICES

BACKGROUND OF THE INVENTION

It has heretofore been proposed, as evidenced by prior U.S. Pats. No. 2,690,240 and 3,433,332, to provide a hoist with a modified Weston type brake, which employs an axially aligned ratchet pawl or plate and ratchet wheel, wherein spring bias is employed to normally bias the ratchet pawl towards and into operative or locking engagement with the ratchet wheel, while allowing axially retrograde movements of the ratchet pawl accommodating for ratcheting rotations of the ratchet pawl accommodating for ratcheting rotations of the ratchet wheel incident to load lifting rotations of a hoist hand wheel.

SUMMARY OF THE INVENTION

The present invention is directed towards improvements in modified Weston brakes of the general type described above, which provides for greater safety in the event of malfunction and improved hoist operating efficiency.

More specifically, the present invention contemplates the provision of a cam device, which serves to rotatably orient a ratchet pawl relative to a hoist housing and to supplement conventional spring force tending to axially bias the ratchet pawl towards the ratchet wheel in response to torque applied to the ratchet pawl by the ratchet wheel during a load lowering operation. This torque results from frictional coupling of the ratchet wheel with the hand wheel, as provided by a friction plate or disc. The arrangement is such as to insure positive engagement of the ratchet pawl with the ratchet wheel during load lowering or holding operating conditions, whereby to minimize wear of their respective teeth to permit safe lowering of the suspended load in the event that the ratchet pawl biasing spring becomes permanently deformed or broken.

Moreover, the utilization of the cam device in the brake construction of the present invention permits the utilization of a ratchet pawl biasing spring, which is relatively weak in comparison to comparable springs necessarily employed in prior constructions. Accordingly, less manual force need be applied to the hand wheel during load lifting operations to overcome the axial pressure exerted by such spring on the ratchet pawl with the result that overall efficiency of a hoist embodying the present invention is increased.

BRIEF DESCRIPTION OF THE DRAWINGS

The nature and mode of operation of the present invention will now be more fully described in the following detailed description taken with the accompanying drawings wherein:

FIG. 3 is a fragmentary elevational view showing the hoist in a partially assembled condition with parts broken away for purposes of clarity.

DETAILED DESCRIPTION

Figure 1:
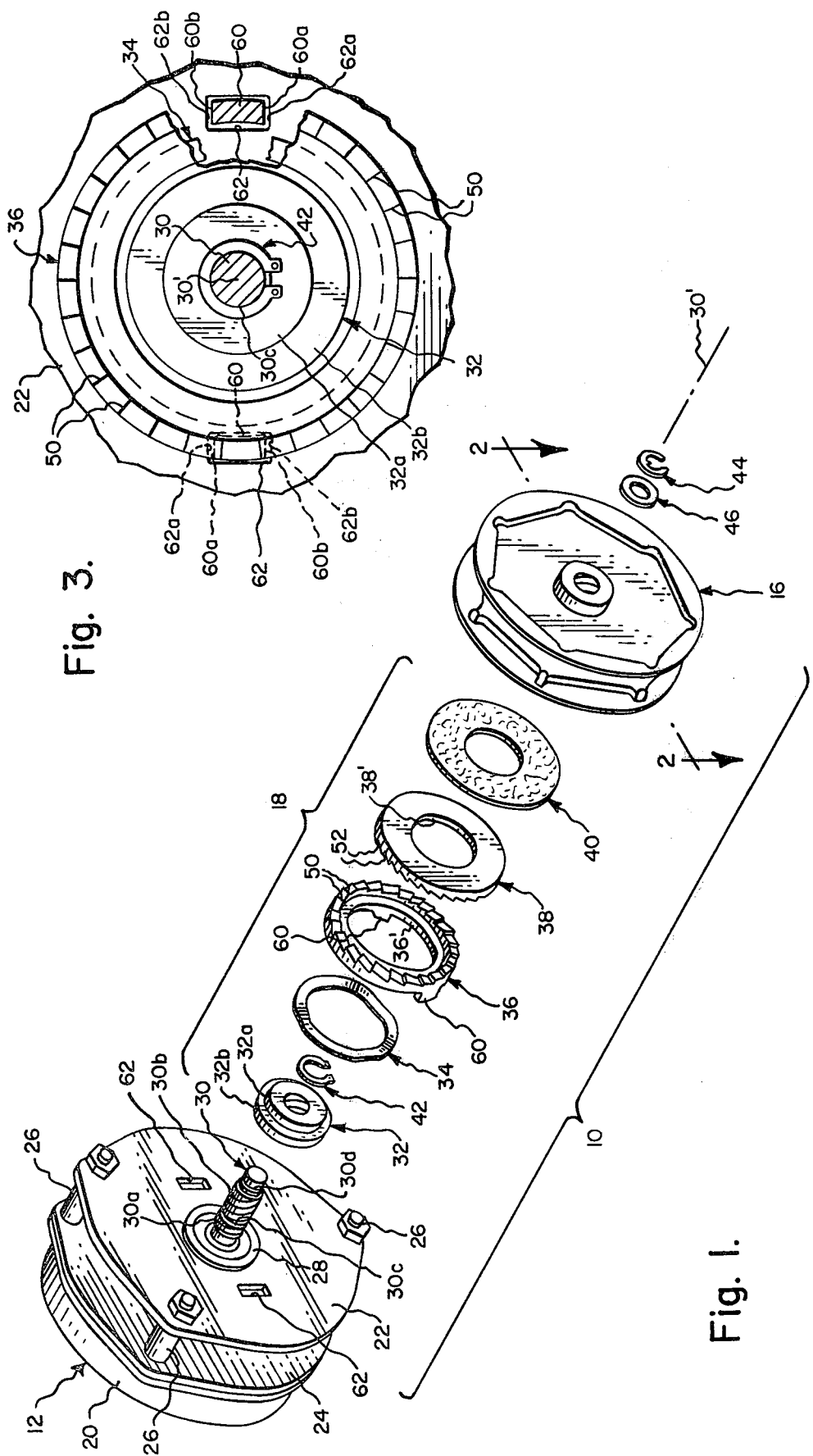
FIG. 1 is an exploded perspective view illustrating a hoist formed in accordance with a preferred form of the present invention.
Figure 2:
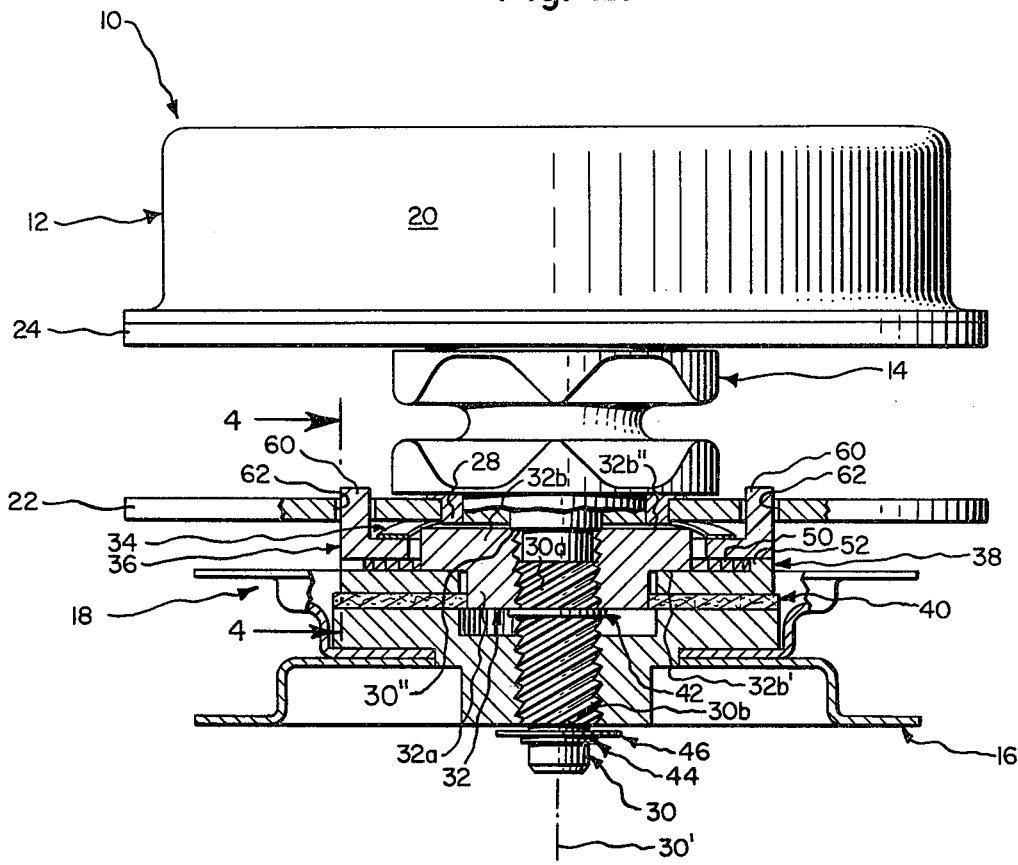
FIG. 2 is a partially sectionalized view taken horizontally through an assembled hoist.

Reference is now made particularly to FIGS. 1 and 2, wherein a hand operated chain hoist formed in accordance with the present invention is designated as 10 and shown as generally including a hoist housing 12; a load or lift wheel 14; a hand wheel 16; and a Weston brake mechanism 18, which serves to operatively interconnect hand wheel 16 with load wheel 14.

Housing 12 is shown in FIGS. 1 and 2 as generally including a casing 20 and a pair of side plates 22 and 24, which are arranged on axially opposite sides of load wheel 14 and are fixed to each other and to casing 20 by bolt-spacer devices 26. The side plates mount suitable bearing devices only one of which is shown and designated as 28 in FIGS. 1 and 2, for journaling load wheel 14. While not specially illustrated in the drawings, it will be understood that a drive shaft 30, which comprises a part of Weston brake mechanism 18, is supported to extend concentrically through load wheel 14 and is drivingly coupled thereto for conjunctive rotary movements by a suitable gear train enclosed within casing 20. The concentric arrangement of load wheel 14 and drive shaft 30 is preferred over the conventional parallel arrangement of these parts, such as is shown for instance in U.S. Pat. No. 2,690,240, in that it results in a substantial reduction in the overall size of housing 12. Also, while not specifically illustrated in the drawings, it will be understood that hoist 10 would include a housing attached hook or other suitable device for use in suspending hoist 10 from a suitable support; suitable guide devices for use in training a load lift chain or cable about the periphery of load wheel 14; and a manually manipulatable chain adapted to be trained about hand wheel 16 for the purpose of effecting oppositely directed load lifting and load lowering rotations thereof, which occur in clockwise and counter-clockwise directions, respectively, as viewed in FIG. 1.

By again making reference to FIGS. 1 and 2, it will be understood that Weston brake mechanism 18 is conventional from the standpoint that it includes in addition to drive shaft 30, a brake plate 32; a ratchet spring device 34; a ratchet pawl or plate 36; a ratchet wheel 38; and a friction braking device, such as may be defined by a friction disc 40. More specifically, the end of drive shaft 30 projecting from housing 12 is shown as being provided with helically threaded inner and outer portions 30a and 30b; an annular groove 30c, which serves to axially separate threaded portions 30a and 30b and is dimensioned to receive a snap ring 42; an annular groove 30d, which is dimensioned to receive a snap ring 44; and a hand wheel bearing washer 46. By viewing FIG. 2, it will be understood that brake plate 32 is threadably received by inner screw portion 30a for both rotational and limited axial movement between the limits defined by bearing 28 and snap ring 42; and that hand wheel 16 is threadably mounted on outer threaded portion 30b for both rotational and limited axial movements between the limits defined by bearing washer 46 and the adjacently disposed parts of mechanism 18. Alternatively, brake plate 32 may be simply keyed against movement relative to shaft 30.

Again referring to FIG. 2, it will be seen that brake plate 32 is of a stepped diameter configuration such as to define a reduced diameter outer portion 32a, which is sized to slidably and rotatably support friction disc 40 essentially concentrically of the axis 30' of shaft 30, and an enlarged diameter bearing portion 32b whose outer or front and inner or rear radially extending surfaces 32b' and 32b'' are arranged for bearing engagement with ratchet wheel 38 and shoulder 30'' of shaft 30, respectively.

As is conventional, the axially facing surfaces of ratchet pawl 36 and ratchet wheel 38 are formed with a plurality of annularly arranged ratchet teeth 50 and 52, respectively, which are arranged to permit ratcheting rotations of the ratchet wheel 38 relative to the ratchet pawl 36 in a clockwise direction, as viewed in FIG. 1, while constraining the ratchet wheel from oppositely directed rotational movements relative thereto. Ratchet pawl 36 and ratchet wheel 38 are provided with through openings 36' and 38', which are preferably sized to loosely receive brake plate portions 32a and 32b, respectively, while insuring that the inner or rear surface of ratchet wheel 38 is aligned for engagement with brake plate bearing surface 32b'.

Figure 4A:
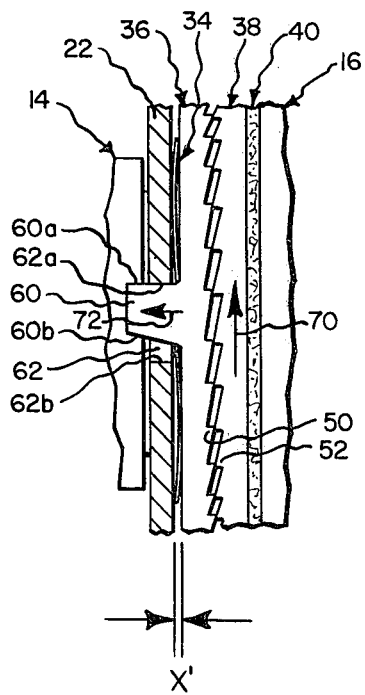
FIGS. 4, 4A, 4B are sectional views taken generally along the line 4—4 in FIG. 2, but depicting successive hoist operating conditions.
Figure 4:
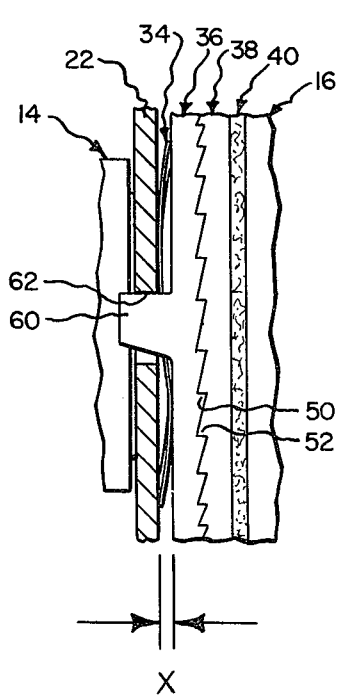
Figure 4B:
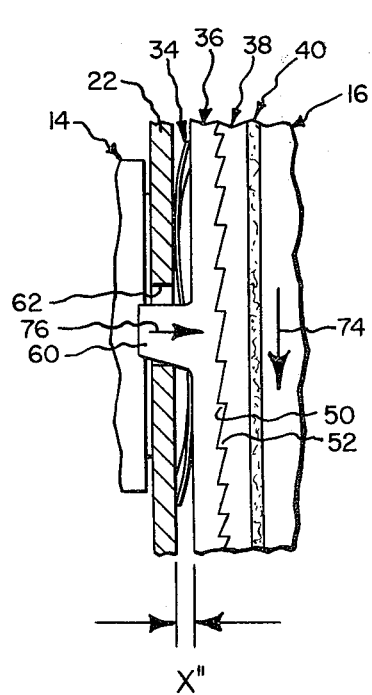

Spring device 34 is preferably in the form of a wave type metal spring, which is dimensioned to be arranged loosely concentrically outwardly of brake plate portion 32b and operatively intermediate side plate 22 and the inner or rear surface of ratchet pawl 36, as shown in FIGS. 2–4B. As is conventional, spring device 34 normally tends to bias ratchet pawl axially outwardly towards ratchet wheel 38, whereby tending to maintain ratchet teeth 50 and 52 in fully seated engagement, as shown in FIGS. 2, 4 and 4B, while being deformable to permit retrograde axial movements of the ratchet pawl as required to permit ratcheting rotations of the ratchet wheel relative thereto, as shown in FIG. 4A.

As is conventional with Weston brake mechanisms, the direction of the screw threads on drive shaft 30 is chosen such that load lifting rotations of hand wheel 16 or the weight of a load applied to load wheel 14 will tend to screw the hand wheel onto the drive shaft, ie. shift the hand wheel axially towards housing 12, for the purpose of operating the brake. This inwardly directed axial movement of the hand wheel 16 results in clamping of ratchet wheel 36 between brake plate bearing portion 32b and hand wheel 16; friction disc 40 enhancing the frictional action or coupling between the ratchet and hand wheels. When ratchet wheel 38 is clamped in this manner, brake plate 32, hand wheel 16 and drive shaft 30 are locked together for rotation as a single unit, whereby to permit a load attached to load wheel 14 to be raised by load lifting rotations of the hand wheel. During load lifting rotations of hand wheel 16, spring device 34 deforms to permit ratchet wheel 38 to undergo clockwise directed ratcheting rotations relative to ratchet pawl 36 and hoist housing 12. If operator applied lifting force is removed from hand wheel 16, the weight of the load applied to load wheel 14 will tend to rotate drive shaft 30, brake plate 32, ratchet wheel 38 and the hand wheel in a reverse direction to lower such load. This tendency for reverse rotation is resisted by operative engagement of ratchet wheel teeth 52 with ratchet pawl teeth 50, as is conventional with this genral type of hoist. The load may, however, be lowered by operator induced counterclockwise or load lowering rotations of hand wheel 16, which serves to "unscrew" or back off the hand wheel sufficiently to release ratchet wheel 38 from positive clamping connection with brake plate 32, hand wheel 16 and drive shaft 30 and permit initiation of load lowering rotations of the load wheel and drive shaft.

A load lowering operation may be continued as long as the operator continues to rotate hand wheel 16 at a rate sufficient to compensate for the tendency for load lowering rotations of drive shaft 30 to "screw" the hand wheel axially towards housing 12. Upon removal of operator force from the hand wheel, the hand wheel is automatically "screwed" axially inwardly along the drive shaft for the purpose of again operating the Weston brake mechanism in the manner indicated above.

In conventional Weston brake mechanisms, it is necessary to employ a relatively strong spring device to insure that the ratchet teeth 50 and 52 are maintained fully seated during load lowering or holding operations in order to prevent wearing movements therebetween and/or deformation of the ends of the ratchet teeth resulting from tooth point-to-point engagement. Otherwise, the wearing away and/or deformation of teeth 50 and 52 would eventually permit ratcheting rotations of ratchet wheel 38 relative to ratchet pawl 36 in a load lowering direction and result in "falling" of a suspended load. Further, if the spring device employed in a conventional Weston brake mechanism should fail, separation of teeth 50 and 52 will likely occur regardless of the degree to which they are worn and this will also result in "falling" of the suspending load.

The present invention departs from conventional Weston brake mechanisms of the type described for instance in U.S. Pat. No. 2,690,240 in the manner in which ratchet pawl 36 is coupled or fixed to side plate 22. Specifically, in prior constructions, the ratchet pawl is supported for reciprocating movements axially of the drive shaft, but constrained from rotations relative to housing 12 by a plurality of parallel, side plate mounted guide pins slidably received within guide apertures formed in the ratchet pawl. In accordance with the present invention, ratchet pawl 36 is movably coupled to side wall 22 by a cam arrangement for both axial and limited rotary movements. This cam arrangement preferably includes a plurality of lugs or cam elements 60, which are fixed to or formed integrally with the rear surface of the ratchet pawl so as to extend essentially co-directionally with shaft axis 30'; and a plurality of generally rectangular openings 62, which are formed in the side wall 22 and dimensioned to loosely receive lugs 60, as indicated in FIGS. 3 and 4. Openings 62 are arranged to extend essentially tangentially to a circle whose center is coincident with shaft axis 30'. Lugs 60 and openings 62 are characterized as having first surfaces 60a and 62a and second surfaces 60b and 62b, respectively. Each pair of surfaces 60a and 62a are arranged essentially parallel with shaft axis 30' and cooperatively engaged, as indicated in FIG. 4A, to constrain ratchet pawl 36 from conjunctive rotations with ratchet wheel 38, during ratcheting rotations of the latter relative to housing 12, as well as to guide the ratchet pawl for axially directed reciprocating movements. Of the second surfaces, surface 62b is preferably arranged to extend essentially parallel relative to shaft axis 30', whereas surface 60b is inclined relative to such axis in order to define a cam surface. Thus, when second surfaces 60b are forced into cooperative engagement with second surfaces 62b in the manner shown in FIG. 4B, ratchet pawl 36 is cammed to undergo a slight rotary and axial displacement relative to side plate 22. The length of lugs 60 will of course be sufficient to prevent removal thereof from within openings 62 during a load lowering operation. It will be understood that in an alternative construction, surfaces 62b or both of surfaces 60b and 62b may be inclined, and legs 60 may be carried by side plate 22 and openings 62 defined by ratchet pawl 36.

Operation of a hoist incorporating the present invention will now be described by first making reference to FIG. 4, which shows the arrangement of parts incident to hand wheel 16 having been rotated in a load lifting direction sufficiently to effect clamping of ratchet wheel 38 between brake plate 32, and the hand wheel. At this point in operation of the hoist, hand wheel 16, ratchet wheel 38, brake plate 32 and shaft 30 are locked together for rotation as a unit; spring 34 serves to positively bias ratchet pawl teeth 50 into full seated engagement with ratchet wheel teeth 52, such that ratchet pawl 36 is spaced from side plate 22 through a distance "x"; and lug surface 60a cooperates with opening surface 62a to prevent clockwise directed rotation of the ratchet pawl, while serving as a guide during axially directed reciprocating movements thereof.

After the parts of the Weston brake have been "locked" together in the manner described with reference to FIG. 4, continued load lifting rotation of hand wheel will cause ratcheting rotations of ratchet wheel 38 relative to ratchet pawl 36 and side plate 22, as indicated by arrow 70 FIG. 4A; spring 34 resiliently deforming to permit retrograde or inwardly directed axial movements of the ratchet pawl towards the side plate, as indicated by arrow 72 in FIG. 4A. The initial spacing "x" between ratchet pawl 36 and side plate 22 is preferably sufficient to allow a spacing "x" to remain between these parts after the ratchet pawl has been displaced in this manner in order to prevent spring device 34 from being fully deformed. Spring device 34 will of course tend to return the ratchet pawl to its position shown in FIG. 4.

When load lifting force is removed from hand wheel 16, lowering of the load will be prevented by engagement of lug surfaces 60b with opening surfaces 62b and by engagement of teeth 50 with teeth 52, until such time as the hand wheel is intentionally rotated by an operator in its load lowering direction.

As previously indicated, lowering of a load attached to load wheel 14 may be selectively effected by operator induced rotation of hand wheel 16 in a counter-clockwise or load lowering direction. This serves to "unscrew" the hand wheel axially outwardly along shaft 30 sufficiently to release the positive clamping connection peviously established between the brake plate, hand wheel and ratchet wheel. However, the arrangement of parts is such that hand wheel 16 normally remains to some degree frictionally coupled with ratchet wheel 38 via friction disc 40, due to the tendency of spring device 34 and the present cam arrangement to drive ratchet pawl 36, the ratchet wheel and the friction disc axially towards the hand wheel, as generally indicated in FIG. 4B by the presence of spacing "x'''" between the ratchet pawl and side plate 22, which is slightly in excess of spacing "x".

During the lowering operation, the camming arrangement of the present invention supplements operation of spring device 34 in tending to maintain teeth 50 and 52 in fully seated engagement, whereby to prevent wear producing movement therebetween. In this connection, the frictionally induced drag resulting from rotation or slippage of hand wheel 16 relative to ratchet wheel 38, as indicated by arrow 74 in FIG. 4B, develops a torque tending to produce counter-clockwise rotations of the ratchet wheel. This torque is transmitted to ratchet pawl 36 and causes lugs 60 to cam or ride partially out of openings 62, as indicated by arrow 76 in FIG. 4B, with the result that the ratchet pawl is forced to move axially outwardly of drive shaft 30 to maintain teeth 50 in fully seated engagement with ratchet wheel teeth 52. Moreover, the present camming arrangement is effective in maintaining engagement of teeth 50 with teeth 52 and frictional coupling between the ratchet and hand wheels, even if spring device 34 should completely fail or become partially ineffective during a load lowering operation. If spring device 34 should fail during hoist operation, the load may be safely lowered, but the hoist will be thereafter inoperative for load lifting purposes until the defective spring device has been replaced.

The performance or operating characteristics of the present camming arrangement may be varied, as for instance by varying the slope of lug surfaces 60b.

The present invention also serves to improve hoist operating efficiency. In this connection it will be appreciated that some predetermined axial force must be available for maintaining teeth 50 and 52 fully seated and the frictional coupling between the ratchet and hand wheels, during the load lowering operation. When this axial force is supplied entirely by a spring device, as in prior hoist constructions, the whole of this axial force necessary opposes retrograde movements of the ratchet pawl, during ratcheting rotations of the ratchet wheel. This in turn maximizes the force which an operator must apply to the hand wheel for the purpose of raising any given load. By comparison, in the present invention, wherein the cam arrangement supplements operation of spring device 34 only during the load lowering operation, the component of the required axial force attributable to spring device 34 may be relatively small. In that the present cam arrangement preferably merely serves as a guide for the ratchet pawl, during load lifting operations, only the relatively small component of axial force attributable to spring device 34 is operable to oppose retrograde movements of the ratchet pawl. Accordingly, the operator force required to be applied to the hand wheel for raising any given load is minimized.

It is contemplated that my basic concept of employing a camming arrangement to supplement axial force developed by a spring device during a load lowering operation, while minimizing operator load lifting force requirements, may be employed in hoist constructions other than that specifically described above.

I claim:

1. In a hoist utilizing a Weston brake having a ratchet assembly including a ratchet pawl and ratchet wheel, said ratchet assembly being employed during load lifting rotation of a hand wheel for the purpose of coupling a load wheel drive shaft for rotation with said hand wheel and during load lowering rotations of said hand wheel for the purpose of creating frictional braking effects tending to retard load lowering rotations of said drive shaft, the improvement comprising in combination:

cam means for maintaining said ratchet pawl and ratchet wheel in operative engagement during load lowering rotations of said hand wheel relative to said ratchet wheel.

2. In a hoist having a housing and utilizing a Weston brake having a ratchet assembly including a ratchet pawl, a ratchet wheel and spring means, said spring means being arranged to bias said ratchet pawl axially towards and into operative engagement with said ratchet wheel whereby to prevent ratcheting rotation of said ratchet wheel relative to said ratchet pawl during a hoist load lowering operation, while permitting retrograde axial movements of said ratchet pawl allowing ratcheting rotations of said ratchet wheel relative to said ratchet pawl incident to a hoist load lifting operation, the improvement comprising in combination:

cam means for guidably supporting said ratchet pawl for said retrograde axial movements during said hoist load lifting operation, and for supplementing operation of said spring means by forcing said ratchet pawl into operative engagement with said ratchet wheel during said load lowering operation.

3. The improvement according to claim 2, wherein said cam means include a plurality of lugs extending essentially co-directionally with said retrograde axial movements and carried on one of said ratchet pawl and said housing and a plurality of lug receiving openings formed in the other of said ratchet pawl and said housing, said lugs and openings having cooperating first surfaces engageable to constrain said ratchet pawl from conjunctive rotations with said ratchet wheel during said ratcheting rotations thereof and having second surfaces engageable for translating said ratchet pawl axially towards and into operative engagement with said ratchet wheel during said load lowering operation.

4. The improvement according to claim 3, wherein said legs are formed as part of said ratchet pawl.

5. In a hoist mechanism including a Weston brake mechanism operable for interconnecting a hand wheel with a load wheel, said mechanism having parts including a threaded load wheel drive shaft operably supporting said hand wheel on a housing of said hoist for rotations in opposite load lifting and load lowering directions, a ratchet wheel, a ratchet pawl, a brake plate, spring means and friction means, said parts being operably interconnected whereby hoist operator induced rotations of siad hand wheel in said load lifting and load lowering directions tends to couple and uncouple said hand wheel, said ratchet wheel and said drive shaft for conjunctive rotations, respectively, said spring means tending to bias said ratchet pawl into operative engagement with said ratchet wheel, whereby to permit ratcheting rotations of said ratchet wheel relative to said ratchet pawl during rotations of said hand wheel in said load lifting direction while constraining said ratchet wheel from rotations relative to said ratchet pawl when said hand wheel is rotated in said load lowering direction, the improvement comprising:

cam means responsive to rotations of said hand wheel in said load lowering direction relative to said ratchet wheel for supplementing operation of said spring means in maintaining said ratchet pawl in operative engagement with said ratchet wheel.

6. An improvement according to claim 5, wherein said ratchet pawl, said ratchet wheel, said friction means and said hand wheel are serially arranged axially of said shaft, said cam means includes a plurality of lugs extending essentially co-directionally of the axis of said shaft and carried on one of said ratchet pawl and said hoist housing and a plurality of lug receiving openings formed in the other of said ratchet pawl and said hoist housing, said lugs and openings having cooperating first surfaces engageable to constrain said ratchet pawl from conjunctive rotations with said ratchet wheel during said ratcheting rotations thereof and having cooperating second surfaces engageable for translating said ratchet pawl axially towards and into cooperative engagement with said ratchet wheel as an incident to torque applied to said ratchet pawl due to frictional braking engagement of said hand wheel and said ratchet wheel with said friction means during rotations of said hand wheel in said load lowering direction.

7. The improvement according to claim 6, wherein said lugs are formed as part of said ratchet pawl.

8. The improvement according to claim 7, wherein said second surfaces of said lugs are inclined relative to the direction in which said axis of said shaft extends for defining cam surfaces engagable with said second surfaces of said opening.

9. The improvement according to claim 5, wherein said cam means additionally serves to support said ratchet pawl for reciprocating movement axially of said drive shaft during said ratcheting rotations of said ratchet wheel.

10. In a hoist utilizing a Weston brake having a ratchet assembly including a ratchet pawl, a ratchet wheel and spring means, said spring means tending to bias said ratchet pawl for movement axially towards and into operative engagement with said ratchet wheel whereby to prevent ratcheting rotation of said ratchet wheel relative to said ratchet pawl during a hoist load lowering operation, while permitting retrograde axial movements of said ratchet pawl allowing ratcheting rotations of said ratchet wheel relative to said ratchet pawl incident to a hoist load lifting operation, the improvement comprising in combination:

cam means operable during said load lowering operation for establishing a force acting on said ratchet pawl for supplementing operation of said spring means in maintaining said ratchet pawl in operative engagement with said ratchet wheel.

11. In a hoist having a housing and utilizing a Weston brake having a ratchet assembly including a ratchet pawl, a ratchet wheel and spring means, said spring means tending to bias said ratchet pawl for movement axially towards and into operative engagement with said ratchet wheel whereby to prevent ratcheting rotation of said ratchet wheel relative to said ratchet pawl during a hoist load lowering operation, while permitting retrograde axial movements of said ratchet pawl allowing ratcheting rotations of said ratchet wheel relative to said ratchet pawl incident to a hoist load lifting operation, the improvement comprising in combination:

a plurality of lugs carried on one of said ratchet pawl and housing; and a plurality of lug receiving openings carried on the other of said ratchet pawl and housing, said lugs and openings having cooperating first surfaces engageable for constraining said ratchet pawl from conjunctive rotations with said ratchet wheel during said ratcheting rotations thereof while guidably supporting said ratchet pawl for said retrograde axial movements, and said lugs and openings having cooperating second surfaces engageable for forcing said ratchet pawl into operative engagement with said ratchet wheel during said lowering operation.

12. In a hoist utilizing a Weston brake having a ratchet assembly including a ratchet pawl, a ratchet wheel and spring means, said spring means tending to bias said ratchet pawl for movement axially towards and into operative engagement with said ratchet wheel whereby to prevent ratcheting rotation of said ratchet wheel relative to said ratchet pawl during a hoist load lowering operation, while permitting retrograde axial movements of said ratchet pawl allowing ratcheting rotations of said ratchet wheel relative to said ratchet pawl incident to a hoist load lifting operation, the improvement comprising in combination:

cam means operable during said load lowering operation for establishing a force supplementing said bias of said spring means in maintaining said ratchet pawl and said ratchet wheel in operative engagement, said cam means being inoperable to establish said force during said load lifting operation.

13. In a hoist utilizing a Weston brake having a ratchet assembly including a rachet pawl, a ratchet wheel and spring means, said spring means tending to bias said ratchet pawl for movement axially towards and into operative engagement with said ratchet wheel whereby to prevent ratcheting rotation of said ratchet wheel relative to said ratchet pawl during a hoist load lowering operation, while permitting retrograde axial movements of said ratchet pawl allowing ratcheting rotations of said ratchet wheel relative to said ratchet pawl incident to a hoist load lifting operation, the improvement comprising in combination:

cam means operatively responsive only to said hoist load lowering operation for establishing a force supplementing said bias of said spring in maintaining said ratchet pawl and said ratchet wheel in operative engagement.

* * * * *